United States Patent [19]

DuBois

[11] Patent Number: 5,034,466
[45] Date of Patent: Jul. 23, 1991

[54] POLYMER AND PROCESS FOR MAKING THE SAME

[75] Inventor: Donn DuBois, Houston, Tex.

[73] Assignee: Shell Oil Company, Houston, Tex.

[21] Appl. No.: 516,580

[22] Filed: Apr. 30, 1990

[51] Int. Cl.$^5$ .................. C08F 4/44; C08F 261/06
[52] U.S. Cl. ................................ 525/247; 525/244; 525/312
[58] Field of Search ............... 526/332, 137, 190; 525/312, 244, 247

[56] References Cited

U.S. PATENT DOCUMENTS 4,866,145  9/1990  Dicker .............................. 526/190

FOREIGN PATENT DOCUMENTS 74004055  1/1974  Japan .
096195/13  2/1989  Japan .
43507  2/1990  Japan .
1561968  3/1980  United Kingdom .

OTHER PUBLICATIONS

M. Miyamoto, M. Sawamoto, and T. Higashimura, Living Polymerization of Isobutyl Vinyl Ether with the Hydrogen Iodide/Iodine Initiating System, Macromolecules 1984, vol. 17, pp. 265-268.

Chemical Abstract 111:58538h, 1989.
"Living Cationic Polymerization of P-Methoxystyrene by Hydrogen . . . ", Higashimura et al., Polymer Bulletin, 19, 7-11, 1988.
"Hydrogen Iodide/Zinc Iodide: A New Initiating System for Living Cationic . . . ", Sawamoto et al., Macromolecules, 1987, 20, 2693-2697.
"Mechanism of Living Polymerization of Vinyl Ethers by the Hydrogen Iodide . . . ", Higashimura et al., Macromolecules, 1985, 18, 611-616.
"Synthesis of Monodisperse Living Poly(vinyl ethers) and Block Copolymers . . . ", Miyamoto et al., Macromolecules, 1984, 17, 2228-2230.
"Synthesis of P-Methoxystyrene-Isobutyl Vinyl Ether Block Copolymers by Living Cationic . . . ", Higashimura et al., Macromolecules, 1979.

Primary Examiner—Joseph L. Schofer
Assistant Examiner—Wu C. Cheng

[57] ABSTRACT

Vinyl ether copolymers and a method of preparing the same. The vinyl ether is copolymerized with styrene, alkyl-substituted styrenes, alkoxy-substituted styrenes and mixtures thereof. In the process, a cadmium halide is used with hydrogen iodide or a suitable iodine containing electrophile, as the coinitiator.

14 Claims, No Drawings

POLYMER AND PROCESS FOR MAKING THE SAME

BACKGROUND

1. Field of the Invention

This invention relates to a polymer and to a process for making the same. More particularly, this invention relates to an alkenyl ether copolymer prepared via cationic polymerization and to a process for preparing the same.

2. Prior Art

Copolymers of vinyl ether are, of course, known in the prior art. For example, Higashimura et al. describe a process for polymerizing vinyl ether and para-methoxy styrenes wherein a catalyst obtained by combining HI and $I_2$ or $HI/ZnX_2$ wherein X is a halogen such as iodine, chlorine or bromine is used, Higashimura et al., Polymer Bulletin, Vol. 19, 7-11 (1988). This system is not particularly effective in the preparation of copolymers, however, and as indicated infra in the comparative examples, the amount of comonomer actually entering the copolymer is significantly less than the amount of comonomer actually incorporated into the feedstock. In light of this deficiency, then, it is believed readily apparent that there is a need for an improved process that will yield a copolymer more closely approaching a theoretical composition based on feedstock and for a polymer produced by such a process.

SUMMARY OF THE INVENTION

It has now been discovered that the foregoing and other disadvantages of the prior art vinyl ether copolymers and process for preparing the same can be overcome or at least significantly reduced with the copolymers and process of the present invention. It is, therefore, an object of the present invention to provide a copolymer which more closely resembles the theoretical ratio of monomers in the feedstock and a process for preparing such a copolymer. It is another object of this invention to provide a vinyl ether copolymer having substantially the same amount of each monomer in the copolymer as was in the initial feed blend and a process for making such a copolymer. It is yet another object of this invention to provide a process for making such a copolymer wherein the polymerization is achieved using cationic catalysis.

In accordance with the present invention, the foregoing and other objects and advantages are accomplished by copolymerizing a vinyl ether with either styrene or an alkyl or alkoxy substituted styrene or a mixture thereof and a process wherein cadmium halide ($CdX_2$ wherein X is chlorine, bromine, fluorine and iodine) ($CdI_2$) is used as a cocatalyst. In the process of the present invention, the cadmium halide will be used in combination with either hydrogen iodide (HI) or a suitable iodine-containing electrophile capable of addition to unsaturated monomer. As indicated supra, if the polymerization is conducted under favorable conditions with respect to solvent and temperature, nearly quantitative portions of both monomers will be incorporated into the copolymer.

DETAILED DESCRIPTION OF THE INVENTION

As just indicated, the present invention relates to a process wherein a vinyl ether is copolymerized with either styrene or an alkyl or an alkoxy substituted styrene or mixtures thereof. It is, however, important to the instant invention that the ether moiety of the vinyl ether be terminal. The vinyl ether useful in the present invention will then satisfy the general formula:

wherein:

R' is an alkyl, cycloalkyl or alkyl substituted cycloalkyl, aromatic or alkyl substituted aromatic functional group having from about 1 to about 20 carbon atoms with the proviso that if R' is cyclic it will contain at least three carbon atoms and if it is aromatic the same will have at least six carbon atoms, R' may, of course, but need not be substituted with such groups as halogen, epoxy, tertiary amine, vinyl, siloxy and the like.

Alkyl or alkoxy substituted styrenes useful in the present invention will satisfy the general formula:

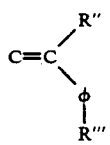

wherein:

R" is hydrogen or an alkyl functional group having from 1 to about 5 carbon atoms and R''' is hydrogen or an alkyl, or alkyloxy radical having from 1 to about 10 carbon atoms.

As also indicated supra, the catalyst useful in the process of the present invention is prepared by combining trimethylsilyliodide, hydrogen iodide or another suitable iodine-containing electrophile with a cadmium halide to produce a useful catalyst. While the inventor does not wish to be bound by any particular theory, it is believed that the two components react to form a Lewis acid/base complex with a growing cation

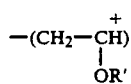

that is bound to an iodine counterion as illustrated as follows:

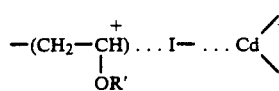

Heretofore, catalysts of this general type have worked poorly for copolymerization of monomers of the type useful in this invention, but the catalyst system of this invention is particularly useful as a copolymerization catalyst for these monomers. As indicated supra, the catalyst of this invention, when contacted with the monomers for a sufficient period of time, will enable at least 98% of both monomers to enter the copolymerization reaction, as either a tapered copolymer, random, or a true block copolymer.

In general, the copolymerization of this invention may be carried out in batch, continuous or semi-continuous operations. In any case, however, the nominal holding time will range from about 10 to about 30 minutes to insure that at least about 98 mole % of both monomers, taken separately, enter into the copolymerization reaction. The catalyst will be preparing by combining from about 0.5 to about 1 equivalents of cadmium iodide per equivalent of HI or other suitable electrophile, including trimethylsilyliodide. The amount of HI or other suitable electrophile directly determines the theoretical molecular weight of the polymer by the general expression:

$$M_n = M/[E]$$

wherein:
  $M_n$ = predicted molecular weight;
  M = grams of monomer; and
  [E] = moles of HI or other suitable electrophile.

In general, the copolymerization reaction of this invention will be accomplished at a temperature within the range from about −80° to about 50° C. in hydrocarbon, etheral or halogenated hydrocarbon solvents that do not contain acidic hydrogens and which are inert to the reagents used. The pressure employed is not critical and essentially any pressure may be employed while atmospheric pressure is particularly effective.

The polymers of this invention are useful as interfacial agents, adhesives or in adhesive formulations and as rheological modifiers.

PREFERRED EMBODIMENT OF THE INVENTION

In a preferred embodiment of the present invention, a styrene/vinyl ether copolymer will be prepared using a catalyst obtained by combining hydrogen iodide or trimethylsilyliodide with cadmium iodide. The styrene/vinyl ether copolymer will contain from about 1 to about 99 w % styrene and from about 99 to about 1 w % vinyl ether. The vinyl ether will have the general formula:

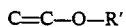

wherein:
  R' in the preferred embodiment is an alkyl group having from about 1 to about 20 carbon atoms.

The preferred catalyst will be prepared by combining from about 0.1 to about 1.0 moles of cadmium iodide per mole of trimethylsilyliodide or hydrogen iodide. The preferred polymer will be prepared at a temperature within the range from about −20° to about 50° C. in an alkane, halogenated hydrocarbon or aromatic hydrocarbon solvent at atmospheric pressure.

Having thus broadly described the present invention and a preferred embodiment thereof, it is believed that the invention will become even more apparent by reference to the following examples. It should be appreciated, however, that the examples are presented solely for purposes of illustration and should not be construed as limiting the invention.

EXAMPLE 1

In this Example, a block copolymer of isobutylvinyl ether (IBVE) and p-methoxystyrene was prepared at atmospheric pressure by first charging 5.5 g (an amount sufficient to yield a polymer theoretically containing 77.9 mol % isobutylvinyl ether) into a bottle containing 80 ml hexane and 20 ml CH$_2$Cl$_2$. This mixture was cooled to approximately 0° C. at which point 30 microliters of trimethylsilyliodide was injected followed by 1.5 ml of a 0.04M solution of cadmium iodide. After 10 min., 2.0 g p-methoxystyrene (pMOS) (an amount sufficient to provide a block copolymer theoretically containing 22.1 mol % p-methoxystyrene) was added and allowed to react for 30 min. before the polymerization was terminated with MeOH. The polymer was precipitated in MeOH which is a nonsolvent for the copolymer. Differential Scanning Calorimetry of the polymer showed the presence of two glass transition temperatures one at −34° C. and the other at 134° C.—suggesting a block copolymer. Moreover, Scanning Electron Microscopy of a RuO$_4$ stained film of the block copolymer revealed a lamellar morphology. The amount of isobutylvinyl ether and p-methoxystyrene actually incorporated into the polymer and the theoretical amount which could have been incorporated as are the cocatalyst used and the type of polymer produced are summarized in the Table following Example 4. The theoretical amount is presented under the heading "Theoretical" and the actual amount, as determined using $^1$H NMR is presented under the heading "Actual". Compositions are given in mole %.

COMPARATIVE EXAMPLE 1

In this example, the run of Example 1 was repeated except that zinc iodide was substituted as the cocatalyst. The results actually achieved are summarized in the Table following Example 4 in the same manner as is summarized in Example 1.

EXAMPLE 2

In this example, the run of Example 1 was repeated except that different amounts of monomer were used. The results actually obtained are summarized in the Table following Example 4 and the results are presented in the same manner as summarized in Example 1.

COMPARATIVE EXAMPLE 2

In this Example, the run of Example 2 was repeated except that zinc iodide was substituted as the cocatalyst. The results actually achieved are summarized in the Table following Example 4 and the results are presented in the same manner summarized in Example 1.

EXAMPLE 3

In this Example, the run of Example 1 was again repeated except that the p-methoxystyrene was polymerized first and a still different amount of monomers were used. The results actually achieved are summarized in the Table following Example 4 and the results are presented in the same manner as is summarized in Example 1.

COMPARATIVE EXAMPLE 3

In this Example, the run of Example 3 was repeated except that zinc iodide was substituted as the cocatalyst. The results actually achieved are summarized in the Table following Example 4 and the results are presented in the same manner as is summarized in Example 1.

EXAMPLE 4

In this Example, both the pMOS and IBVE were charged simultaneously into a bottle. Trimethylsilyliodide was then added followed by the addition of 2.0 ml of 0.01M solution of cadmium diodide. The polymerization was continued for 30 min. after which the polymer was precipitated with MeOH. The results actually obtained are summarized in the following Table. The results are presented in the same manner summarized in Example 1. The results are presented by reference to the Example No. with the comparative Examples being designated by a number followed by a "c". The two runs completed in this Example are designated as 4a and 4b for convenience.

TABLE

| Example No. | Theoretical | | Actual | | Co-catalyst Used | Type Polymer |
|---|---|---|---|---|---|---|
| | IBVE | pMOS | IBVE | pMOS | | |
| 1 | 77.9 | 21.8 | 77 | 23 | CdI$_2$ | Block |
| 1c | 77.9 | 21.8 | 91 | 9 | ZnI$_2$ | Block |
| 2 | 64.1 | 35.8 | 63 | 37 | CdI$_2$ | Block |
| 2c | 64.1 | 35.8 | 93 | 7 | ZnI$_2$ | Block |
| 3 | 44.3 | 54.4 | 20 | 79 | CdI$_2$ | Block |
| 3c | 44.3 | 54.4 | 6 | 93 | ZnI$_2$ | Block |
| 4a | 58.1 | 41.9 | 56 | 44 | CdI$_2$ | Tapered Block |
| 4b | 57.8 | 42.2 | 58 | 42 | CdI$_2$ | Tapered Block |

While the present invention has been described and illustrated by reference to particular embodiments thereof, it will be appreciated by those skilled in the art that the same lends itself to variations not necessarily described or illustrated herein. For this reason, then, reference should be made solely to the appended claims for purposes of determining the true scope of the present invention.

Having thus described and illustrated the present invention, what is claimed is:

1. A process comprising the steps of
sequentially polymerizing first a vinyl ether monomer and then a comonomer selected from the group consisting of styrene, alkyl substituted styrenes and alkoxy substituted styrenes in a solution which initially contains a catalyst prepared by contacting cadium halide with a suitable iodine containing electrophile and
recovering a block copolymer.

2. The process of claim 1 wherein said vinyl ether satisfies the general formula C=C—O—R' wherein R' is selected from the group consisting of alkyl, cycloalkyl and alkyl substituted cycloalkyl, aromatic and alkyl substituted aromatic hydrocarbyl groups having from about 1 to about 20 carbon atoms.

3. The process of claim 2 wherein R' is alkyl and has from about 1 to about 5 carbon atoms.

4. The process of claim 3 wherein said contacting is accomplished in a continuous process with a nominal holding time within the range from about 10 to about 30 minutes.

5. The process of claim 4 wherein said comonomer is styrene.

6. The process of claim 1 wherein said comonomer satisfies the general formula:

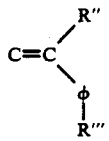

wherein:
R" is selected from the group consisting of hydrogen and alkyl radicals having from 1 to about 5 carbon atoms; and R'" is independently selected from the group consisting of hydrogen, alkyl and alkoxy radicals having from 1 to about 10 carbon atoms.

7. The process of claim 1 wherein the suitable iodine containing electrophile is hydrogen iodine.

8. The process of claim 1 wherein the suitable iodine containing electrophile is trimethylsilyliodide.

9. The process of claim 1 wherein the catalyst is prepared by contacting hydrogen iodine with a cadmium halide.

10. The process of claim 1 wherein the catalyst is prepared by contacting trimethylsilyliodide with a cadmium halide.

11. The process of claim 1 wherein the first monomer and the comonomer are contacted in a solvent, the solvent comprising components selected from the group consisting of hydrocarbons, ethers, halogenated hydrocarbons and mixtures of the above.

12. The process of claim 11 wherein the solvent is hexane.

13. The process of claim 11 wherein the solvent is methyldichloride.

14. The process of claim 13 wherein the solvent is about 80 percent by volume hexane and about 20 percent methyldichloride.

* * * * *